(12) United States Patent
Fannon

(10) Patent No.: US 6,399,955 B1
(45) Date of Patent: Jun. 4, 2002

(54) SELECTIVE ELECTROMAGNETIC WAVELENGTH CONVERSION DEVICE

(76) Inventor: Mark G. Fannon, 2497 King's Cross, Shelby Township, MI (US) 48316-1210

( * ) Notice: Subject to any disclaimer, the term of this patent is extended or adjusted under 35 U.S.C. 154(b) by 0 days.

(21) Appl. No.: 09/506,508

(22) Filed: Feb. 17, 2000

Related U.S. Application Data

(60) Provisional application No. 60/120,955, filed on Feb. 19, 1999.

(51) Int. Cl.[7] .............................. H01K 1/28; H01K 1/34
(52) U.S. Cl. ............................... 250/504 R; 250/493.1; 250/424
(58) Field of Search ................. 250/504 R; 313/17, 313/18, 20, 21, 22, 24, 25, 28, 113

(56) References Cited

U.S. PATENT DOCUMENTS

| | | |
|---|---|---|
| 2,864,025 A | 12/1958 | Foote et al. |
| 2,910,605 A | 10/1959 | Hodge |
| 3,157,775 A | 11/1964 | Harmon |
| 3,160,777 A | 12/1964 | Holcomb |
| 3,211,938 A | 10/1965 | Holcomb |
| 3,316,405 A | 4/1967 | Astheimer |
| 3,449,546 A | 6/1969 | Dhoble |
| 3,622,832 A | 11/1971 | Schlessel et al. |
| 3,804,691 A | 4/1974 | Trivedi |
| 4,101,424 A | 7/1978 | Schooley et al. |
| 4,159,411 A | 6/1979 | Ellersick |
| 4,227,113 A | 10/1980 | Walsh |
| 4,271,363 A * | 6/1981 | Anderson et al. ....... 250/504 R |
| 4,346,323 A | 8/1982 | Hirschfeld |
| 4,552,789 A | 11/1985 | Winchell |
| 4,588,923 A | 5/1986 | Hoegler et al. |
| 4,598,194 A | 7/1986 | Halberstadt et al. |
| 4,604,680 A | 8/1986 | Levin et al. |
| 4,716,658 A | 1/1988 | Jacobi, Jr. |
| 4,791,333 A | 12/1988 | Morris et al. |
| 4,792,716 A | 12/1988 | Walsh |
| 4,797,535 A | 1/1989 | Martin |
| 4,839,559 A | 6/1989 | Ahlgren et al. |
| 5,003,284 A | 3/1991 | Dieudonné |
| 5,157,758 A | 10/1992 | Halberstadt et al. |
| 5,276,763 A | 1/1994 | Göbel et al. |
| 5,382,805 A | 1/1995 | Fannon et al. |
| 5,504,666 A * | 4/1996 | Carmichael ................. 362/294 |
| 5,536,991 A * | 7/1996 | Parham et al. .............. 313/313 |

OTHER PUBLICATIONS

"Radiant Process Heaters," Section 7, pp. 7-1-7-34, Tempco Electric Heater Corp., Visionary Solutions catalog, published prior to Feb. 19, 1999.

* cited by examiner

Primary Examiner—Constantine Hannaher
Assistant Examiner—Albert Gagliardi
(74) Attorney, Agent, or Firm—Harness, Dickey & Pierce, P.L.C.

(57) ABSTRACT

A method and apparatus for increasing the output of an infrared emitter. High temperature concerns affecting the radiant energy transfer efficiency of the infrared emitter are addressed by varying the emitter tube design and varying the locations of both the reflective and high emissivity materials located on the emitter constituent parts. A cooling fluid may be passed through the emitter from both ends to allow higher power density or to cool the emitter during its operation. Selectable wavelength infrared emissions are achieved through the design of the infrared emitter.

37 Claims, 17 Drawing Sheets

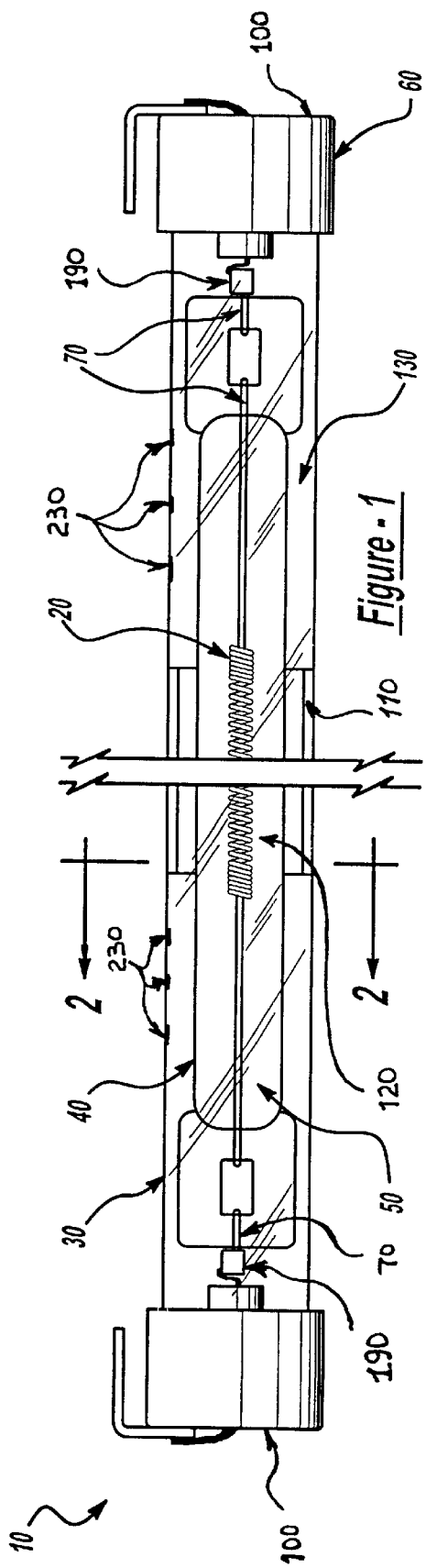
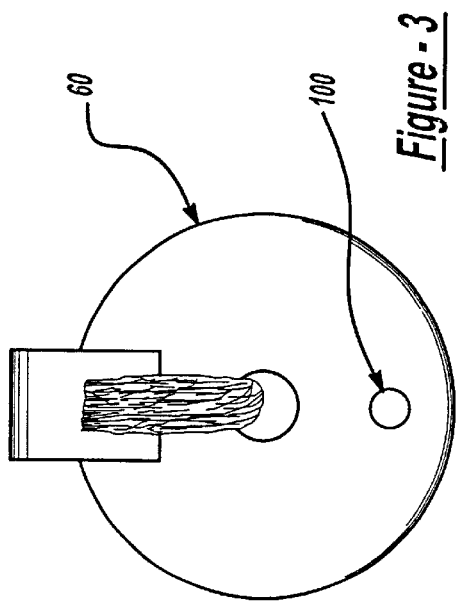
Figure - 3
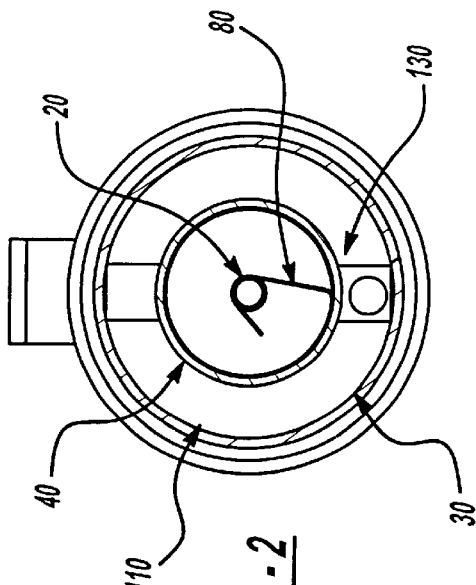
Figure - 2
Figure - 1

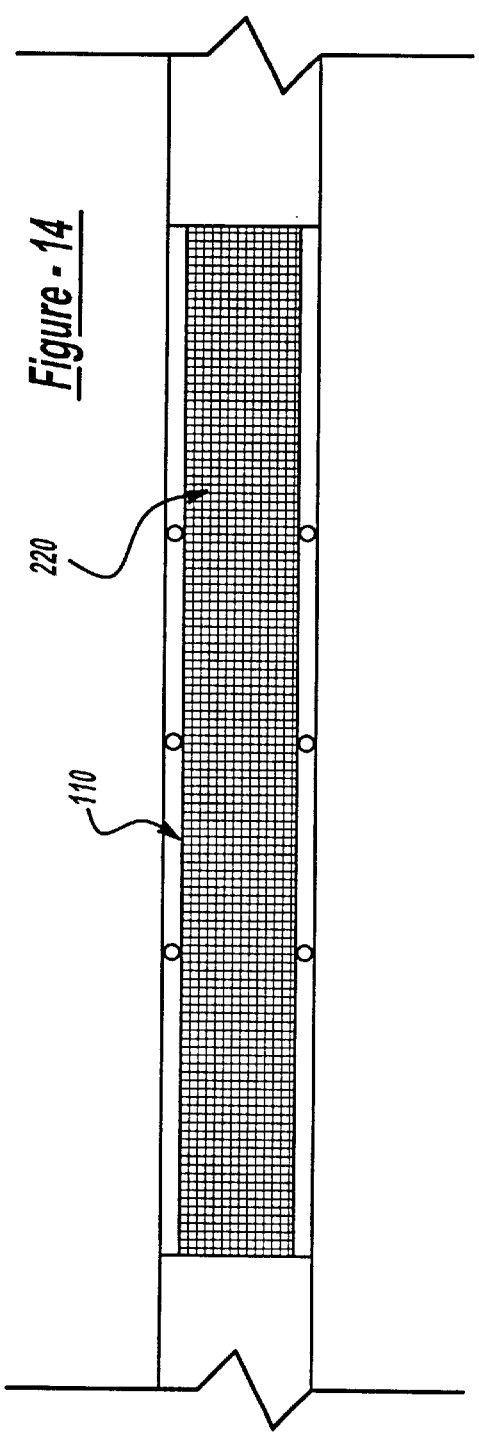
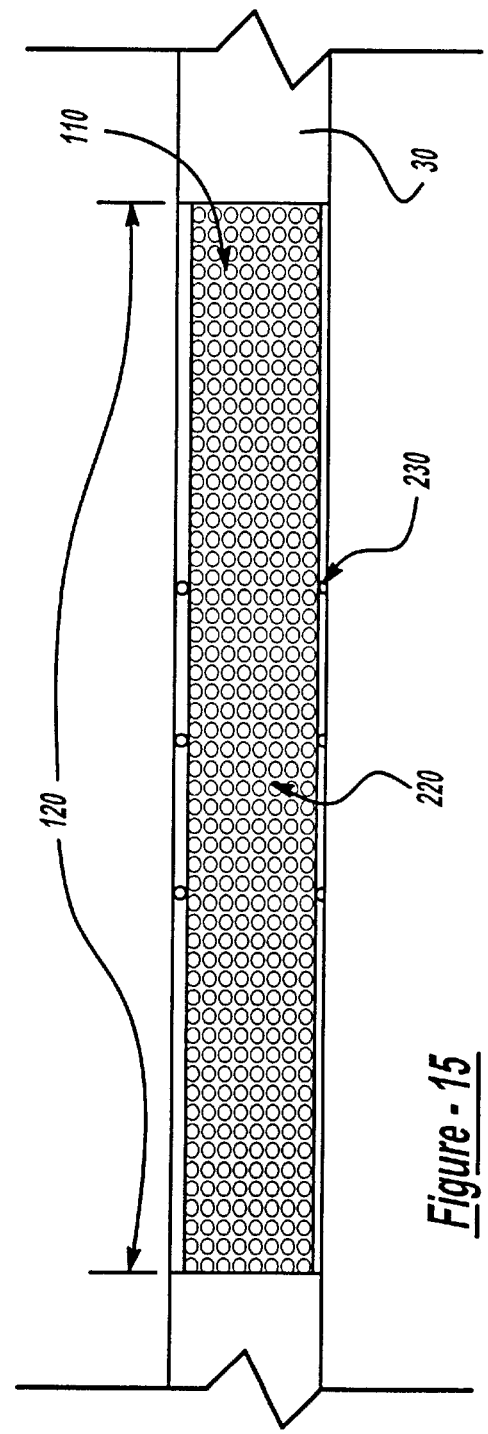

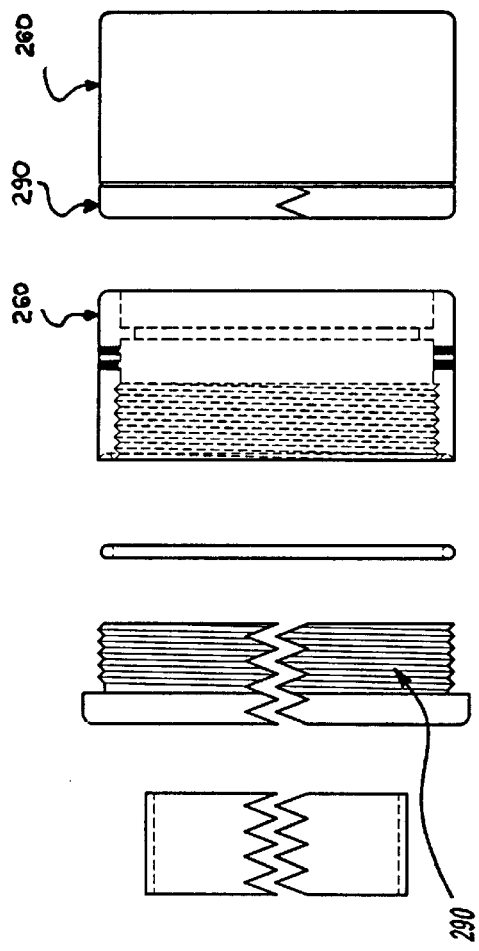
*Figure - 26*
*Figure - 25*
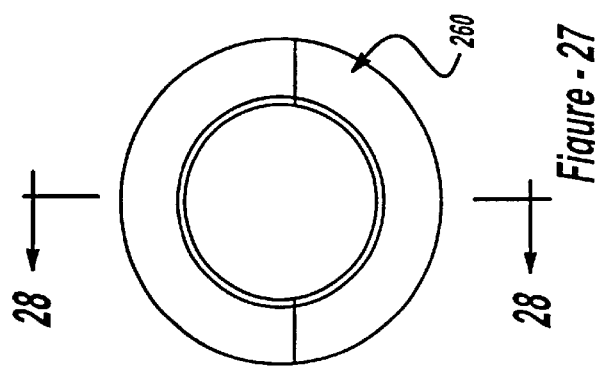
*Figure - 28*
*Figure - 27*

US 6,399,955 B1

SELECTIVE ELECTROMAGNETIC WAVELENGTH CONVERSION DEVICE

This application claims the benefit of U.S. Provisional Application Serial No. 60/120,955 filed Feb. 19, 1999.

TECHNICAL FIELD

The present invention relates to an infrared emitter and, and more particularly, a method and apparatus for increasing the output of an infrared emitter.

BACKGROUND OF THE INVENTION

Infrared emitters provide radiant heat in numerous applications. For instance, they are the preferred heat source for drying paints supplied to metal surfaces, including solvent based paints, water based paints, and powder paints. They also provide heat for environmental test chambers and many industrial processes.

A typical infrared emitter includes a slender tubular quartz enclosure containing an elongated coiled filament that extends through the enclosure and connects to lead-in conductors at opposite ends of the enclosure. Infrared radiation emanates from the filament in all directions in a spherical pattern, and thus the power of the radiant energy decreases in proportion to the square cube of the distance from the emitter. Only the energy which is absorbed by the object is transferred to the object as heat energy, and of the energy which strikes the object, a portion will be reflected, a portion will be absorbed, and depending upon the object, a portion may be transmitted through the object. Only the radiant energy which actually strikes the object and is absorbed provides heat within the object. The remaining radiant energy is redirected or continues travelling through space, thereby reducing the overall energy transfer efficiency from the infrared emitter to the object to be heated.

To improve the radiant energy transfer efficiency, the radiant energy leaving the emitter is generally focused in some manner towards the object to be heated. In one approach the infrared emitters are employed within an enclosed tubular sheath having reflective walls. The energy not directly passing from the infrared emitter to the object and absorbed by the object, continues to be reflective off the surfaces of the chamber until it strikes the object, escaping from an opening in the chamber or dissipating through inefficiencies and the reflectors.

In another application, where the heating chamber must be kept free of articulate matter and cleanliness is essential, the heating chamber of the infrared emitter is constructed using flat walls. This reduces the amount of dust that can form on the external reflectors of the infrared emitter.

In yet another application, a gold reflective coating has been placed on the outer surface of the infrared emitter forming an integral reflector. This feature included with the aforementioned flat wall construction, provides an advantage of improving the radiant energy transfer efficiency and at the same time improving the cleanliness and the heating chamber environment. However, the gold reflective coating places restrictions upon the infrared emitter design. A gold metal reflector coating may simply vaporize off of the surface of the enclosure due to excessive emitter temperature caused by trapped energy within the emitter system.

In still yet another application, an external sheath of quartz or other high transmissive material has been placed about the infrared emitter enclosure, with a reflective metal coating applied to the outer sheath. U.S. Pat. No. 5,382,805 addressed an infrared energy emitter which included a longitudinally extending tubular enclosure infrared energy transmitting material enclosing a longitudinally extending filament. A longitudinally extending outer tubular sheath of infrared energy transmitting material covered the tubular enclosure and was provided with a reflector. This allowed the infrared emitter to run at high power densities while maintaining a relatively cool outer surface temperature. However, higher power densities adversely affect the end seals and reflective coatings. The aforementioned patent tried to overcome this high temperature concern by providing fluid conductive filters at each end of the sheath to filter cooling fluid paths through the emitter. However, the ability to cool the infrared emitter by passing a cooling fluid into the enclosure at one end does not efficiently reduce the high temperature concerns with the integrity of the emitter while attempting to improve the radiant energy transfer efficiency.

It is therefore a principle object of the present invention to provide a method for increasing the output power of an infrared emitter without sacrificing the structural integrity of the emitter. The high temperature concerns associated with the higher power density of the emitted infrared energy are addressed by more efficient heat venting techniques.

It is still another object of the present invention to provide a longitudinally extending hermetically sealed tubular enclosure of infrared energy transmitting material enclosing the filament having at least one inner tubular support device in a predetermined position including a plurality of apertures for fluid flow therethrough.

It is yet another object of the present invention to provide a heat sink which is intimately associated with an electrical conductor extending from the filament out through the tubular enclosure which encapsulates the emitting filament. The heat sink is used to assist in heat dissipation from the infrared emitter and the filament electrical supply conductor, typically a pin.

It is still yet another object of the present invention to provide a longitudinally extending outer tubular sheath of infrared energy transmitting material having an inner and an outer surface with a plurality of ports strategically located at predetermined locations along the outer surface of the sheath. The sheath will have two ends, each end will have at least one passage for fluid flow therethrough. A reflector, comprising a reflective coating on a surface of the sheath, will extend partially circumferentially with the sheath forming a central longitudinal section for the transmission and/or absorption of secondary electromagnetic wave emission.

A heat dissipator comprising a high or low emissivity coating and is disposed over the reflector forming an intimate contact thereto. This also aids in adjusting the temperature of the infrared emitter by strategically and controlled radiant means.

It is still another object of the present invention to provide that the ports be placed in the window of the outer tubular enclosure to direct the exhausted fluid toward the work in process. Alternatively, the ports can be placed so that the fluid will be channeled away from the work in process. The ports also provide pressure relief to accommodate fluid flow into one or both ends of the emitter system.

It is still another object of the present invention to provide high watt densities from small outer tubular diameters while simultaneously cooling the integral reflector material, the outer tubular enclosure, the reflector, and the window. The higher power output capabilities will reduce the overall quantity of emitters required for many systems without reducing the overall system output power while providing increased efficiency.

It is yet another object of the present invention to create different radiation emission patterns by varying the cross-sectional tubular enclosure shape. These shapes may also be combined with other shapes to include a mixture of polygons.

It is yet another object of the present invention to provide an inner tubular support positioned in a predetermined location with respect to the sheath. In addition to its support function, the inner tube support may include passages to permit the flow of the cooling fluid through the inner support. This may allow fluid flow passages configured to achieve a predetermined fluid flow pattern.

It is yet another object of the present invention to provide dual peak wavelengths of infrared emission efficiently from one infrared emitter. This may be accomplished with or without the use of a transducer housing.

It is still yet another object of the present invention to provide selectable electromagnetic peak wavelength emissions.

SUMMARY OF THE INVENTION

The present invention relates to an apparatus and method for increasing the output power of an infrared emitter and addressing the concerns associated with the damaging and undesirable higher temperatures produced within the electromagnetic emitter components. The apparatus and method of the present invention use unique reflection and heat dissipation techniques to accomplish the aforementioned.

In a preferred embodiment of the invention, the apparatus of the present invention includes a method for heating an object with infrared energy by passing a current through an elongated filament, and may be disposed within an hermetically sealed cylindrical enclosure. Surrounding the enclosure is an outer elongated tubular sheath of infrared energy transmitting material having an inner and an outer surface with a plurality of ports strategically located at predetermined locations along the outer surface of the sheath. The sheath has two ends, and each end has at least one passage for fluid flow therethrough. There is a reflective coating on an inner surface of the sheath extending partially, circumferentially with the sheath to form a central longitudinal section referred to as a window. A coating of predetermined emissivity is disposed on the outside of the sheath and is generally congruent to the reflective coating that resides on the inner surface. The central longitudinal section of the sheath is spaced apart from the enclosure about the entire circumference of the enclosure sufficiently to protect the reflective coating from the infrared energy that is emitted by the filament. Infrared radiation from the filament is reflected off of the reflective coating on the sheath, back toward the filament, thus passing infrared radiation towards an object from the filament through the window. A cooling fluid passes through the space between the sheath and the enclosure to cool the enclosure, sheath, the reflective coating and controlled emissivity coating.

BRIEF DESCRIPTION OF THE DRAWINGS

The various advantage of the present invention will become apparent to one skilled in the art by reading the following specification and subjoined claims and by referencing the following drawings in which:

FIG. 1 is a side view of the infrared emitter arranged in accordance with the principles of the present invention and having fluid purging and exhaust ports.

FIG. 2 is a cross-sectional view taken along the line A—A of FIG. 1.

FIG. 3 is an end view of the infrared emitter of FIG. 1.

FIG. 14 is an optional configuration showing a series of lines of controlled emissivity material formed over the window to provide absorption and re-radiation of a different peak infrared emission, possibly combined with the original peak emission, thereby providing a multiple peak emissions or a single longer converted peak IR emission.

FIG. 15 is an optional configuration showing a series of dots of controlled emissivity material formed over the window to provide absorption and re-radiation of a different peak infrared emission, possibly combined with the original peak emission, thereby providing a multiple peak emissions or a single longer converted peak IR emission.

FIG. 25 depicts the split thread fastener detail for attaching the exhaust tube to the outer tube of the infrared emitter.

FIG. 26 depicts an exploded side view of the split thread fastener device for attaching the exhaust tube to the outlet tube of the IR emitter.

FIG. 27 depicts a front view of the assembled exhaust tube fastener device.

FIG. 28 depicts an exploded cross-sectional view of the exhaust tube fastener device.

DETAILED DESCRIPTION OF THE INVENTION

Figure 5:
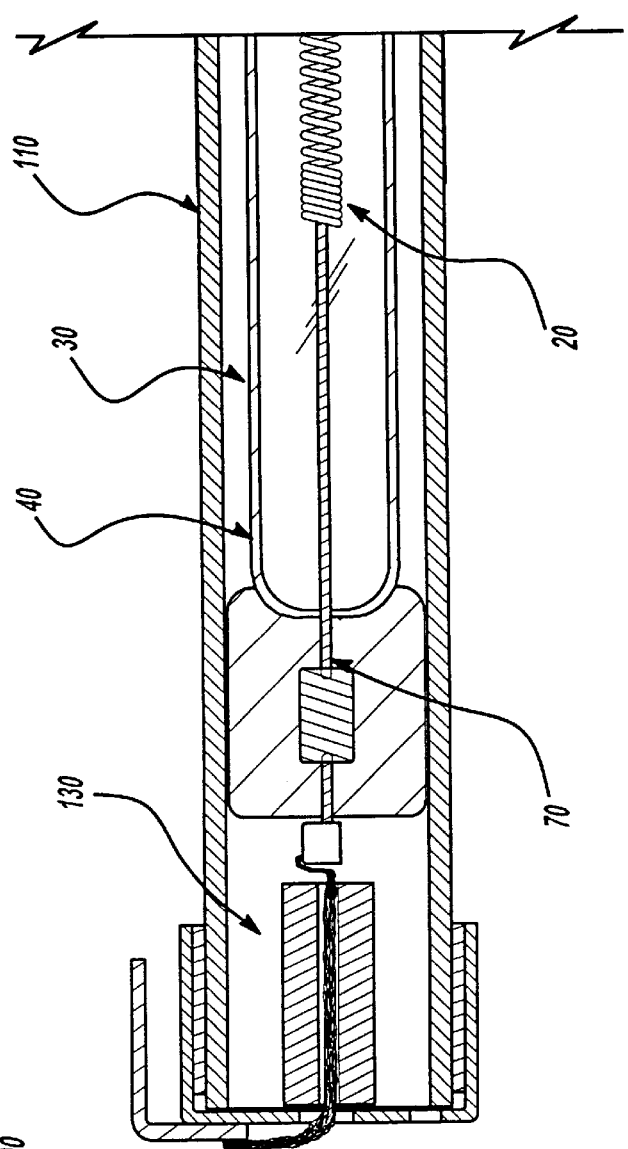
FIG. 5 is a cross-sectional view of the infrared emitter taking along the line 5—5 of FIG. 4.

FIG. 1 illustrates an infrared emitter 10 according to the invention which emits electromagnetic radiation in the infrared portion of the spectrum. The infrared emitter 10 includes a coiled tungsten wire filament 20 enclosed within a hermetically sealed inner tube enclosure 40 containing a halogen gas 50. A longitudinally extending outer tubular sheath of infrared energy transmitting material 30 has a plurality of ports 230 strategically located at predetermined locations along the outer surface of the sheath. The sheath 30 has two end caps 60 with each end cap 60 having at least one passage 100 for fluid flow therethrough. A reflector 110 comprising a reflective coating on a surface of the sheath 30 extends partially, circumferentially with the sheath forming a central longitudinal section henceforth referred to as the window 120. A heat sink 190 is intimately associated with an electrical conductor 70 which extends from the filament 20 out through the enclosure 40. The heat sink 190 assists in reducing the temperature of the electrical conductor 70 during operation of the infrared emitter 10.

Referring to FIG. 2, an interior space 130 is located between the outer tube 30 and the inner tube 40. This interior space 130 helps to protect the reflective coating 110 from the infrared energy being emitted by the filament 20. The interior space 130 is also a passage for the cooling fluid to flow which assists in cooling the reflector material 110, the outer tube 30, and the window 120.

Figure 4:
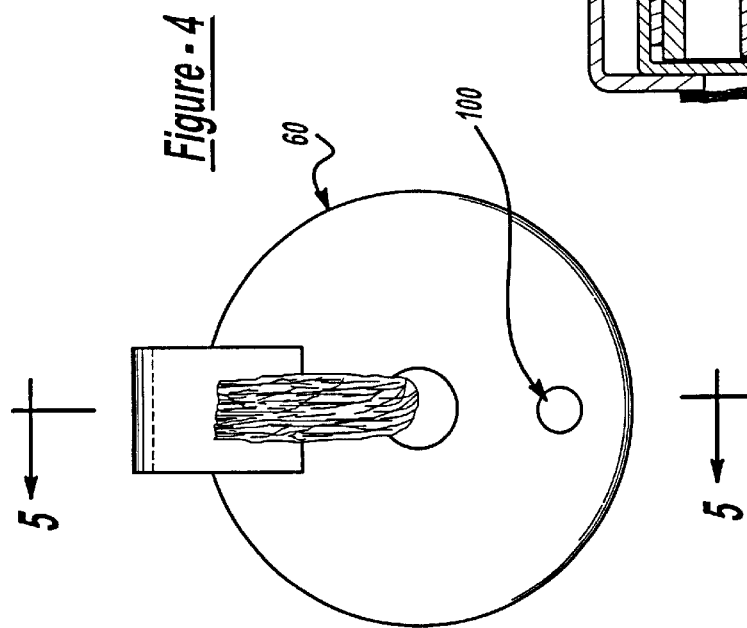
FIG. 4 is an end view of the opposite end of the infrared emitter of FIG. 1.

The end caps 60 of the outer sheath 30 are depicted in FIG. 3. Also depicted in FIG. 3 is a passage for fluid flow 100 through the end cap 60. The other end cap 60 with it associated passage for fluid flow 100 is depicted in FIG. 4.

The fluid flow passage in the interior space 130 is better depicted in FIG. 5.

Figure 6:
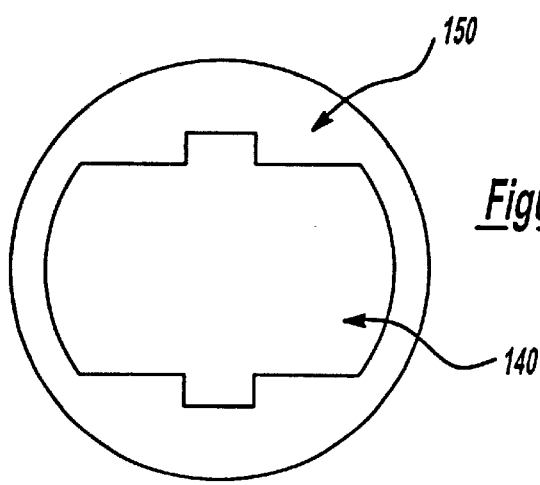
FIG. 6 is an end view of an inner tube support device for supporting the inner tube of the infrared emitter.
Figure 7:
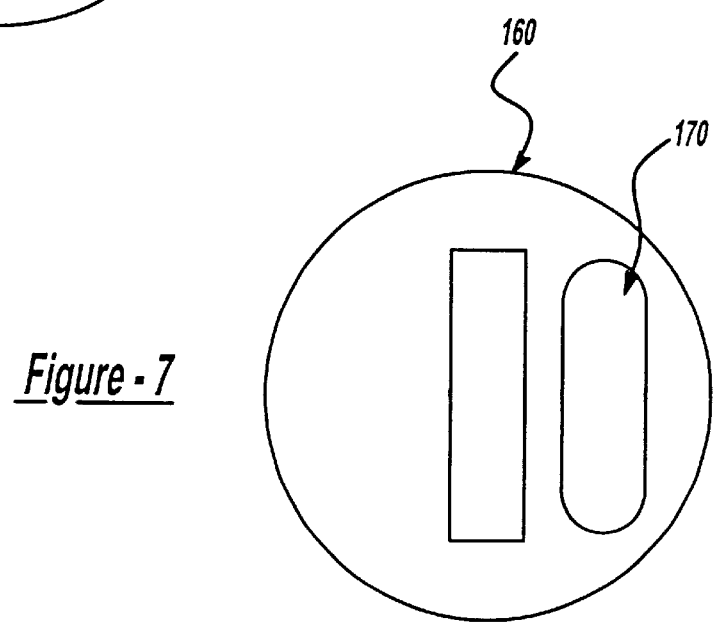
FIG. 7 is an end view of a second inner tube support device for supporting the inner tube of the infrared emitter.
Figure 8:
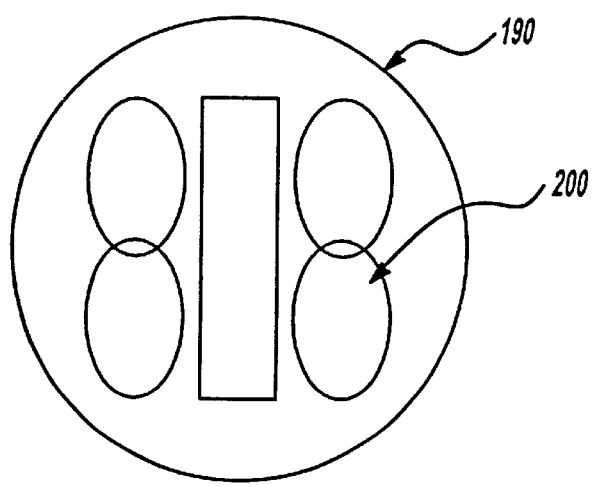
FIG. 8 is an end view of the inner tube support device for supporting the inner tube and for creating a helical fluid flow within the outer tube.

FIGS. 6 through 8 illustrate the various inner tube support devices that maintain the inner tube 40 in a predetermined position. These predetermined positions may include a position concentric with the outer tube 30, in or at a focal point or focal area, or in any other desired position. Materials for the support devices include high temperature material such as ceramic, glass or quartz, or any other material that withstands the temperature and radiation generated by the infrared emitter 10 without breakdown. The support device may also be plated with materials that are intended to strategically reflect the radiation.

The inner tube support devices 150, 160, and 190 include passages 140, 170 and 200 to permit passage of a cooling fluid through the inner support. The inner support permits the passage of fluid with a minimum of resistance or will impose a strategic resistance to direct the fluid flow. In some applications, a support desirably creates a back pressure of fluid flow to prevent a reverse flow from the opposite end with fluid flows into both ends simultaneously. In addition, because fluid can be introduced into both ends of the outer tube 30 due to certain pressure differentials which can exist within the separate fluid flow supplies that may reside on each end of the infrared emitter 10, a strategic back pressure induced on each end assures the proper fluid flow direction on both ends within reasonable differential pressure tolerances.

The various passages 140, 170 and 200 in the inner tube support devices 150, 160 and 190 through their designs, can achieve a predetermined fluid flow pattern. For example, FIG. 6 depicts an inner tube support 150 with a passage 140 that provides uniform fluid flow into one or both ends of the infrared emitter 10. In FIG. 7 the inner tube support device 160 with its associated passage 170 is designed to provide nonuniform fluid flow to create a loop-like current flow internal to the outer tube 30.

FIG. 8 depicts an inner tube support device 190 with a passage 200 for fluid flow in a rotational pattern or in this case, clockwise motion.

Figure 9:
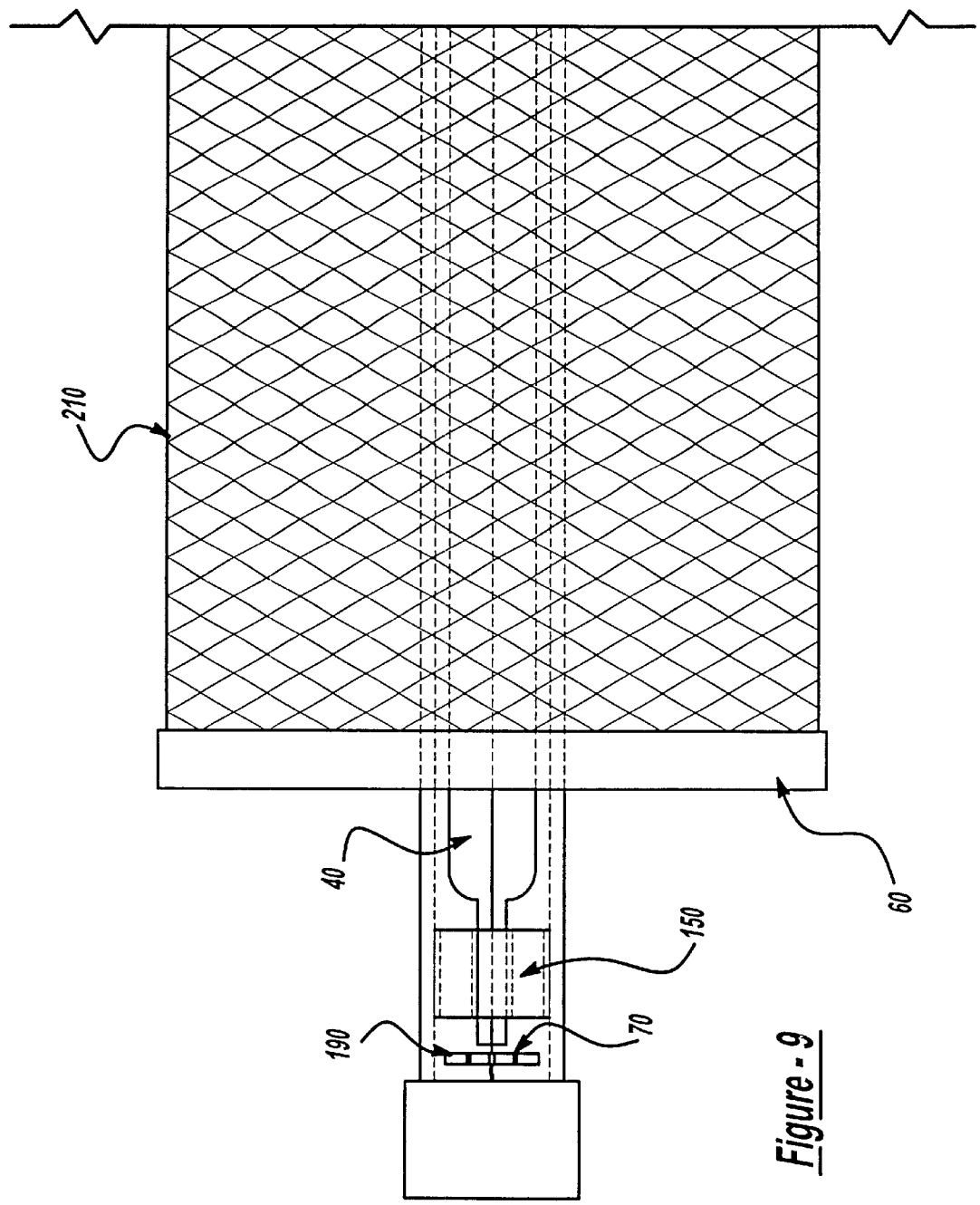
FIG. 9 is a side view of the infrared emitter having an inner tube support device and heat sink fins for cooling the electrical conductor of the infrared emitter and a wave converter housing.
Figure 10:
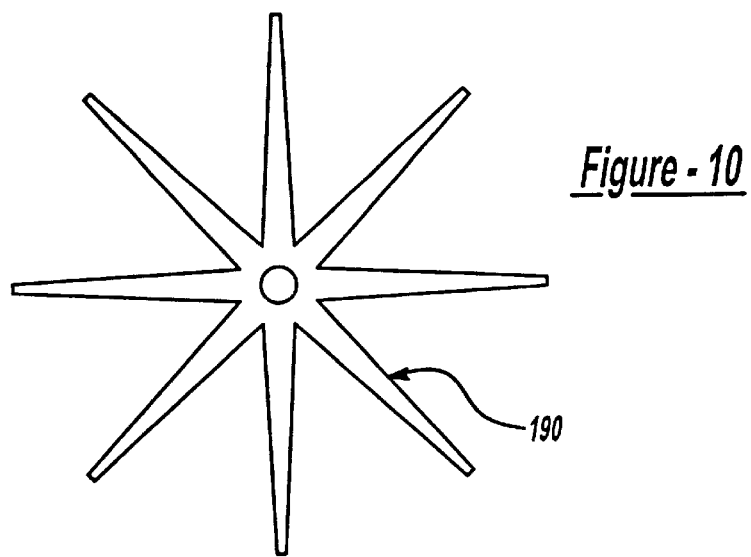
FIG. 10 is an end view of the heat dissipator shown in FIG. 9.

It is desirable to minimize the thermal expansion of the electrical conductor that passes through the inner tube enclosure 40 on one or both ends. Thermal expansion of the electrical conductor 70 limits the current that passes through the electrical conductor 30 limiting the power output of the inner electromagnetic emitter 20. The amount of current flow at least partially determines the generation of heat within the conductor 70 that causes the expansion. If the current exceeds a predetermined threshold, such as 15 amps, then the conductor 70 expands at a rate that differs from the expansion rate of a material like quartz, that contains it. The coefficient of expansion of the conductor material is relatively high compared to the coefficient of expansion of the quartz. If the conductor 70 becomes too hot, excessive conductor expansion resultantly cracks the hermetic seal at the end of the inner tube 40, damaging the inner emitter tube assembly allowing the introduction of oxygen into the inner tube 40. Oxygen damages the structural integrity of the inner filament 20, commonly constructed from tungsten, doped tungsten, or tungsten alloy. FIG. 9 depicts a heat sink 190, for the electrical conductor 70 of the inner tube 40 which intimately contacts the conductor 70. Heat is transferred out of the conductor 70 and into the heat sink material by way of conduction. The heat energy is then transferred into the cooling fluid that passes over the heat sink fins which are evidenced in FIG. 10. The heat sink 190 may be constructed from a material that possesses thermal conductivity, such as copper, aluminum, cermets or metal alloy. The heat sink 190 may also be plated with a highly reflective material that will not absorb the vast majority of wavelengths of electromagnetic energy generated by the emitter device 10. The heat sink device 190 may act as either a conductor or insulator of electrical current depending on particular design considerations.

Figure 11:
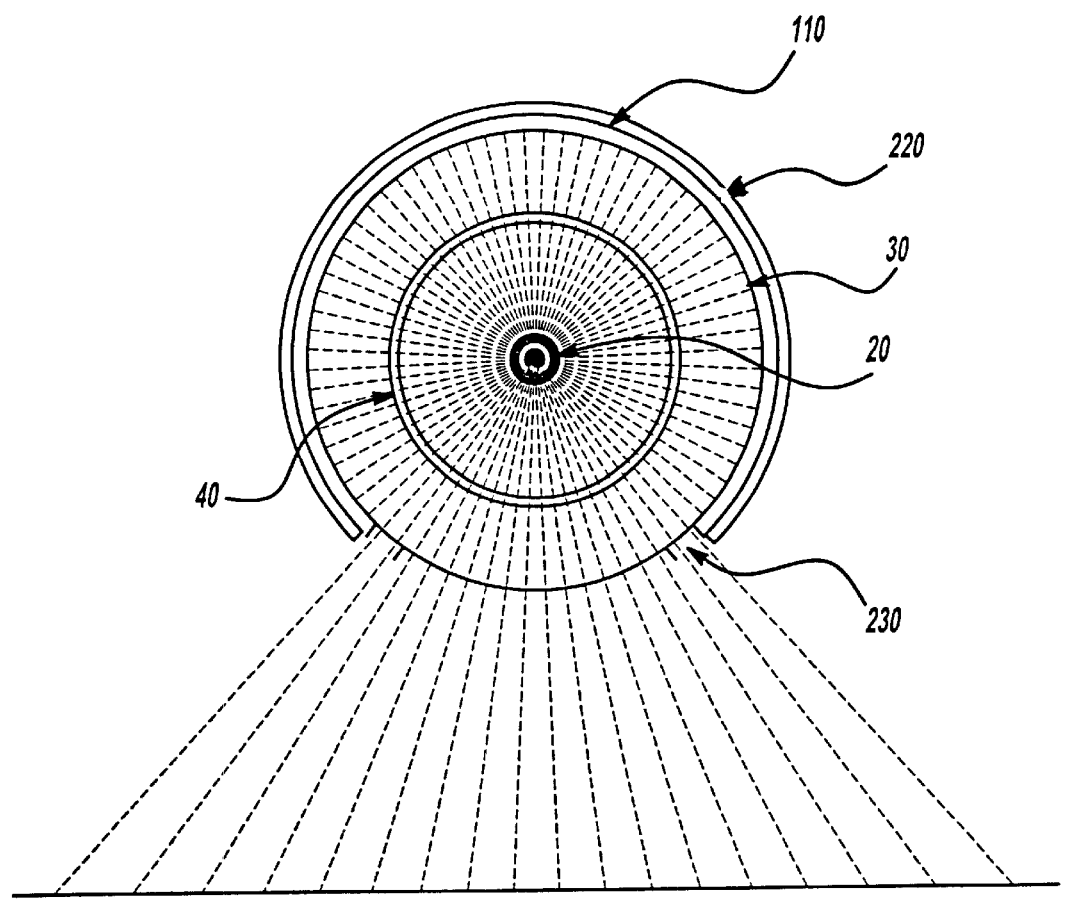
FIG. 11 is a cross-sectional view of an infrared emitter radiant heat dissipator having gold on the outside of the outer tube and a controlled emissivity material on the outer surface of the gold deposition.
Figure 12:
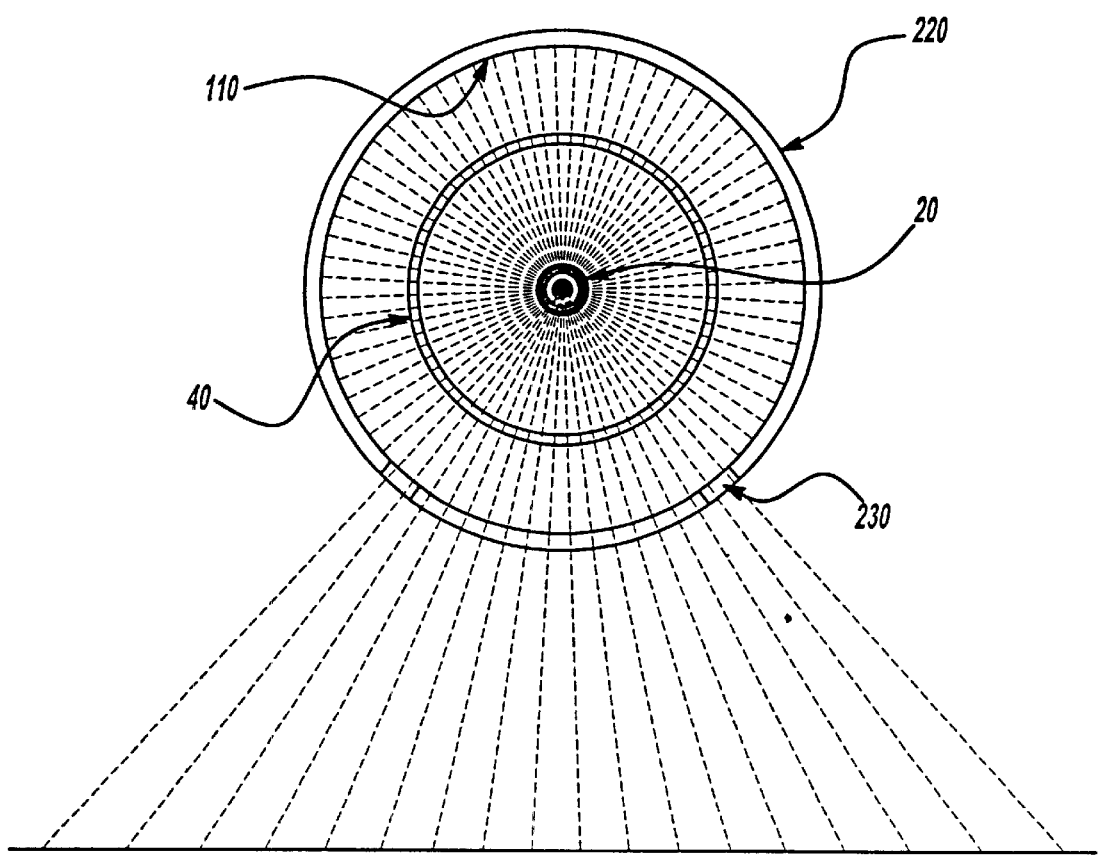
FIG. 12 is a radiant heat dissipator for an infrared emitter having gold formed on the inside of the outer tube and a controlled emissivity material on the outside of the outer tube.
Figure 13:
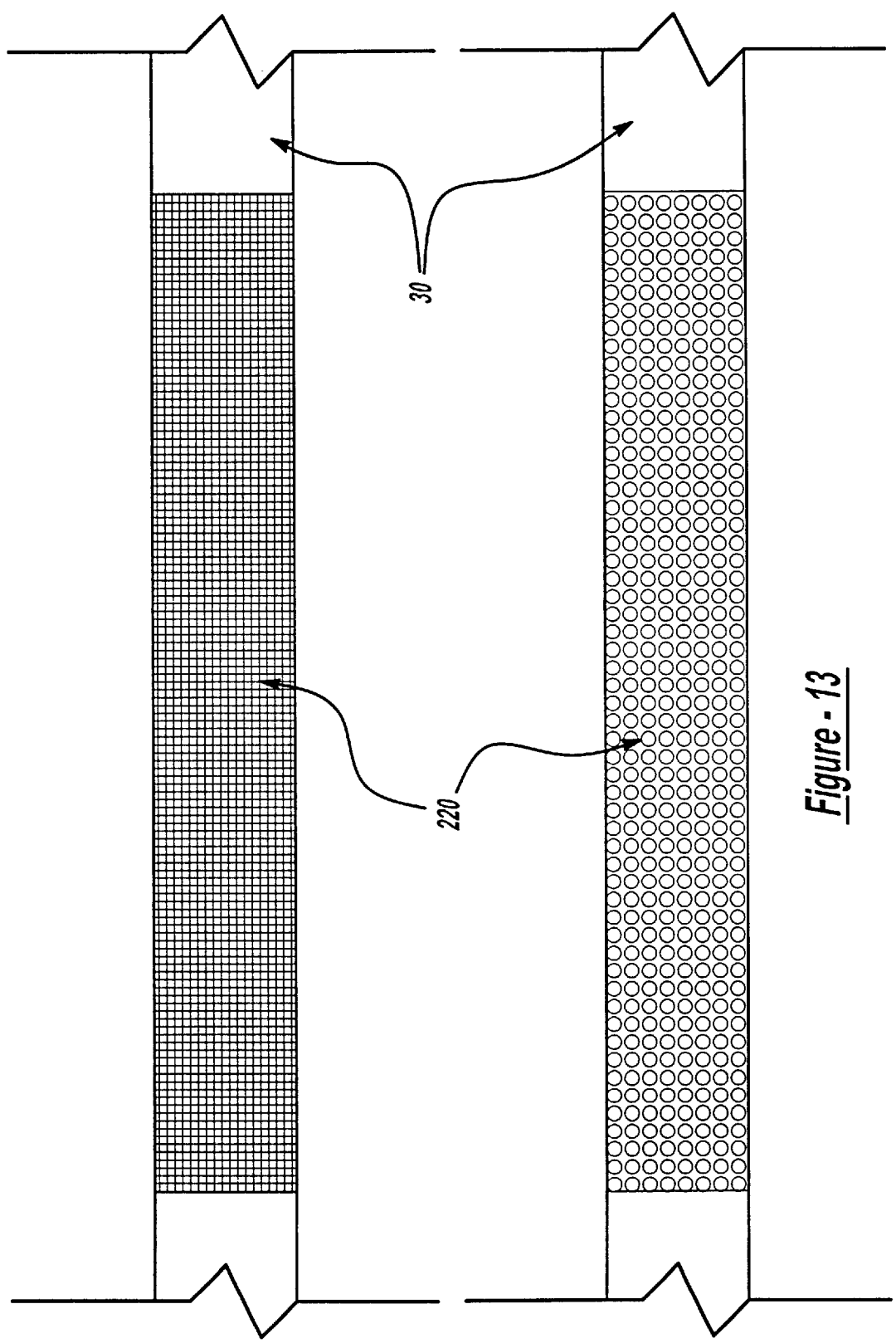
FIG. 13 is an optional configuration showing patterns of controlled emissivity material formed over the gold to regulate a percentage of radiant energy dissipated by the material.

Referring to FIGS. 11–13, the invention includes a thin film integral gold, gold alloy, or high efficient reflector 110, which is placed on the outside surface of the outer tubular enclosure 30. Component temperatures that achieve the latent heat of vaporization of the integral reflector material 110 limit the power density, normally measured in watts per lineal inch. As the watt density increases, the outer tube enclosure 30 and integral reflective film material 110 increase in temperature and eventually attain temperatures that will vaporize the gold reflective film 110. Trapped heat within the outer sheath limits watt density for any particular quartz sheath diameter, which is typically 0.625 inches in the outer diameter. The emitter 10 by having fluid purging that exits through exhaust ports 230 enables the infusion of a cooling fluid into the interior space 130 assist in cooling the entire assembly, including the conductor cooling fin and reflective film material 110.

It is desirable to additionally dissipate the heat from the thin film reflector 110 without supplying increased internal or external air flow. This is accomplished by the use of a radiant heat dissipator 220 which can be seen in FIGS. 11 through 13. In FIG. 11, the controlled emissivity material 220 is disposed over the reflector 110, where the reflector 110 resides on the external surface of the outer tube 30. As the entire emitter 10 rises in temperature, heat rapidly dissipates from the system and, therefore, the gold reflective film 110 through the high emissivity material 220.

If one examines the difference in magnitude between convective and radiant energy losses from any particular surface, it will become apparent that great differences exist where the surface has high emissivity. In the case of the integral gold reflector 110, the outer surface of the integral reflector material 110 has a low emissivity of about 0.08 at room temperature and about 0.18 at approximately 900° F. It is well known in the art that emissivity increases with temperature. The emissivity factor expresses a percentage of possible emissions based on the theoretical black body emitter that is used as the reference standard for emissivity ratings. The low emissivity reflective film 110 cannot sufficiently dissipate heat by means of radiant losses. Therefore, changing the outer surface characteristics of the material 30 or 110 can modify the thermal losses from the thin film material 110. This is accomplished by placing another film of material of controlled emissivity 220 in this embodiment, high in intimate contact with the lower emissivity reflective film 110 or sheath 30. The heat energy then flows by conduction from the gold film reflector 110 or sheath 30 into the high emissivity material 220, and is more efficiently dissipated into space by the new highly emissive surface by radiant means that does not require additional air movement. Examples of high emissivity materials 220 include cermets, ceramics, oxides, and organic materials. These materials may vary in thickness from a thin film to a thick coating. FIG. 12 demonstrates that the radiant heat dissipator 220 may be placed on the outer surface of the outer tube 30 with the reflector of gold 110 on the inside of the outer tube 40. The high emissivity heat dissipation material 220 is preferably disposed adjacent and congruent to the inside reflector 1 10 and is preferably concentric to the reflector 110 when the outer tube 130 is cylindrical as is in this embodiment. The dissipation of radiant energy form the radiant heat dissipator 220 may be limited by the rate of thermal conductivity of the material of the outer tubular enclosure 30 that serves to transfer energy to the dissipation device 220.

To attenuate the quantity of energy dissipated the high emissivity material 220 may be printed as a pattern on the reflector 110, as in FIG. 13. This permits a reduced and controlled radiant loss when using a dissipation material of very high emissivity. FIGS. 14 and 15 provide the conversion of a single peak electromagnetic emission to a modified single peak emission of a longer wavelength or to dual infrared peak emissions simultaneously from a single infrared emitter 10. The dual emission includes the original wavelength emission from the inner emitter filament 20 and a longer wavelength from the secondary surface on the window 120 of the outer tube 30. This is accomplished by placing on the window exterior or interior surface a high emissivity material 220 that absorbs the shorter wave energy, increases in temperature, and radiates the longer peak electromagnetic wavelength into space. This provides a fast thermal response medium or long wave emitter of high efficiency. The longer wavelength from the converting surface will be radiated from both the outside and the inside surfaces of the window. To attenuate the emission, the high emissivity material 220 may be placed on the window 120 in a pattern (see FIGS. 14, 15). The exhaust ports/cooling fluid ports 230 are also evident at predetermined locations, this embodiment, in the window 120.

Varying the amount of high emissivity material 220 printed on the window 120 varies the percentage of power of the longer wavelength emission. The secondary wavelength can be altered by changing the distance between the primary source of the energy, in our case, the tungsten filament, and the high emissivity material 220. This is best accomplished by changing the outer diameter of the outer enclosure 30. A larger diameter outer tube 30 would decrease the temperature of the high emissivity material 220 that resides in the window 120, thereby altering its wavelength toward the longer peak emission period. This occurs because the energy would now be spread over a larger area of material, but output power would remain relatively stable, except for increased convective thermal losses inherent to long wave emitters.

The exhaust/cooling fluid ports 230 in the outer tube of 30 of the emitter 10 enable fluid to pass into one end or both ends of the emitter 10 simultaneously. The fluid exits the exhaust ports 230, which are arranged intermittently to the ends of the emitter 10. As previously indicated, it is preferable to maintain the ends of the inner tube 40 and/or the filament 20 at reasonably low temperatures during the operation of the emitter system. The exhaust ports 230 of this invention permit fluid to pass over one or both ends of the inner tube 40. This maintains the hermetic seal below the maximum recommended operating temperature of about 550 degrees F. The passage of cooling fluid into both ends of the outer tube 30 will permit the flow of cooling fluid to protect both emitter end seals. The placement of the ports 230 in the window 120 of the outer tube 30 direct the heated exhaust fluid toward the work in process. Alternatively, the ports 230 can be placed so that the fluid will be channeled away from the work in process. In addition, the exhaust ports 230 provide pressure relief to accommodate fluid flow into one or both ends of the emitter system 10 because the fluid can escape out of these strategically placed exhaust/cooling fluid ports 230.

Figure 16:
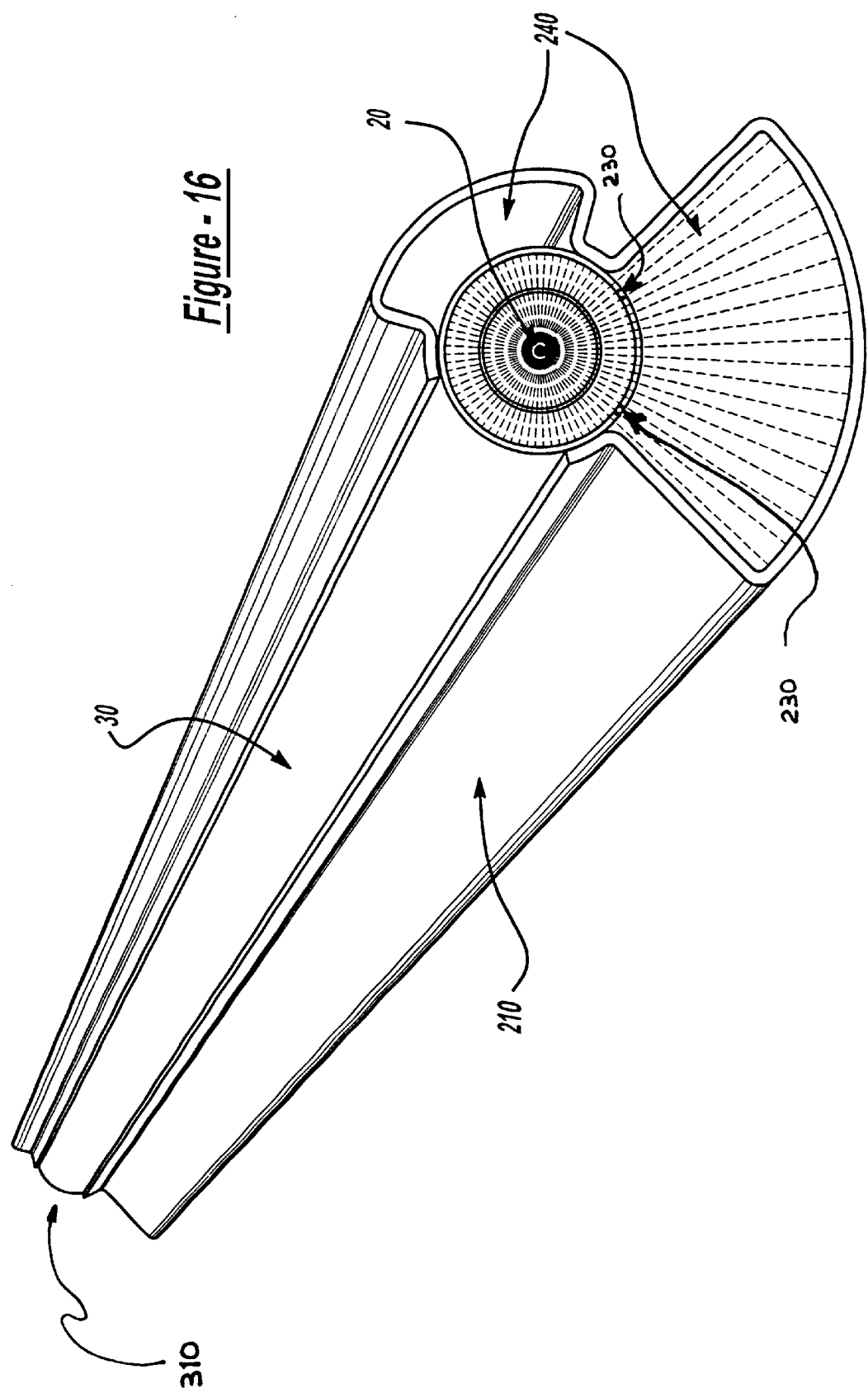
FIG. 16 is a perspective view of an infrared emitter having a selective electromagnetic peak wavelength conversion device.
Figure 17:
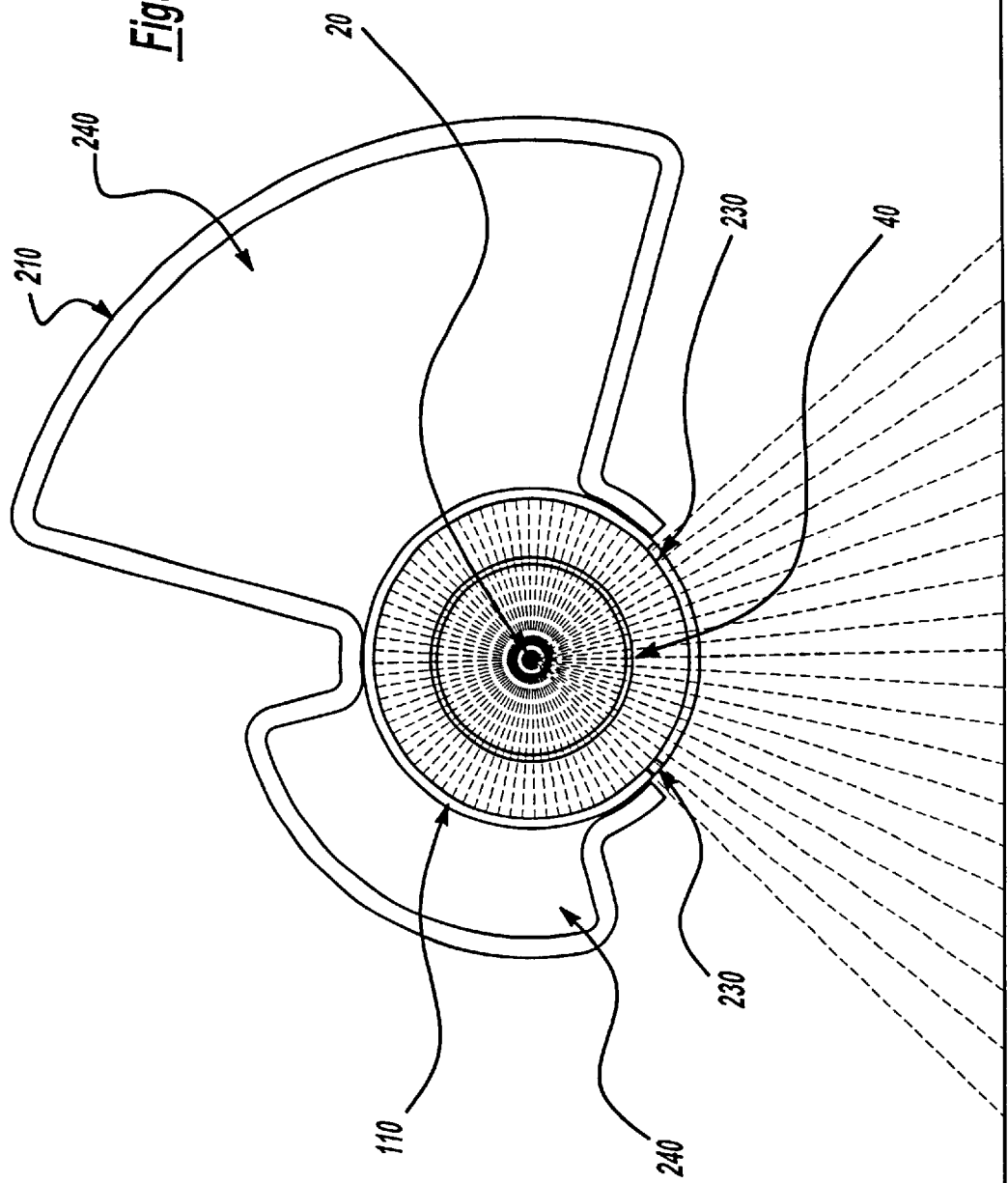
FIG. 17 is a cross-sectional view of the infrared emitter of FIG. 16 showing the wavelength conversion device arranged so that no wavelength conversion occurs.
Figure 18:
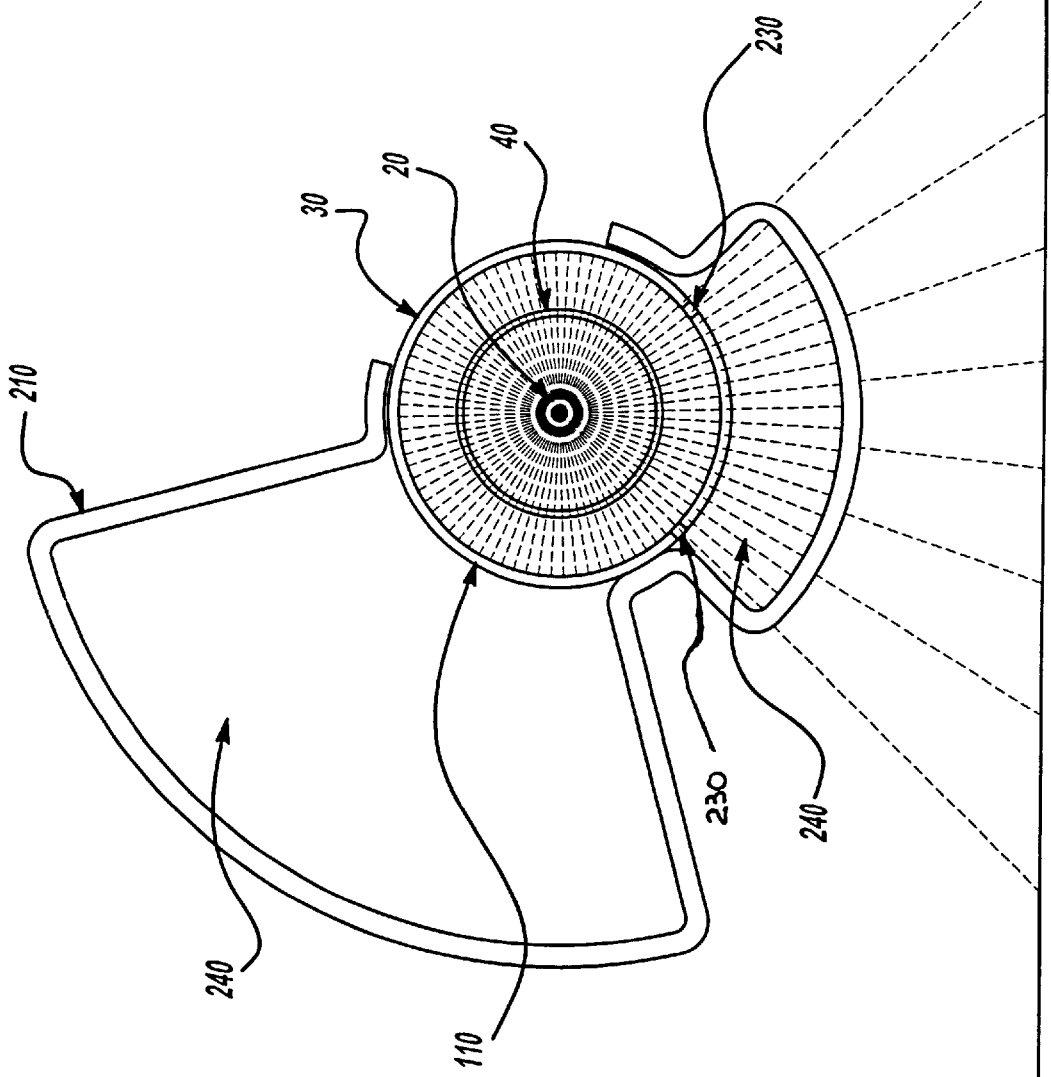
FIG. 18 is a cross-sectional view of the infrared emitter of FIG. 16 showing the wavelength conversion device arranged so that a first wavelength conversion occurs.
Figure 19:
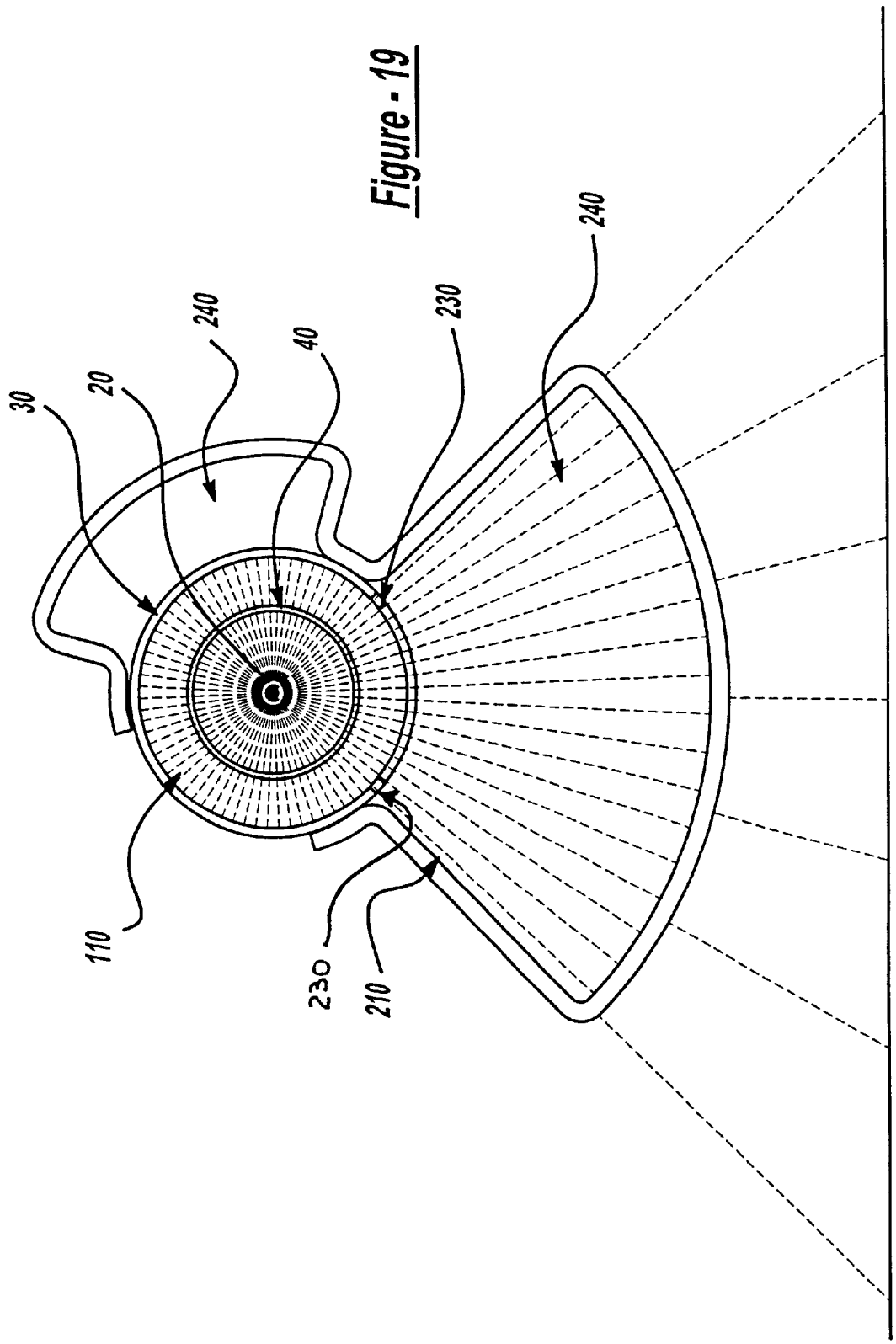
FIG. 19 is a cross-sectional view of the infrared emitter of FIG. 16 showing the wavelength conversion device arranged so that a second wavelength conversion occurs.

In FIG. 16, the infrared emitter 10 is encapsulated by a transducer housing 210. The entire housing 10 can be rotated so that the short-wave infrared emission can 15 be utilized directly as in FIG. 17. The housing 10 can be further rotated so that the short-wave emission is directed into a chamber 240 that directs all emission toward a surface that has a particular radius. In such a position, the short-wave emission is absorbed and spread over a larger area and converted to a longer wavelength, such as a two-micron peak wavelength emission, and is emitted into the environment by the new high emissivity surface that resides on the inner and/or outer surface of the utilized chamber. The focal point, or focal area, of the inside surface of the wave transducer is where the filament 20 resides itself which will promote efficiency by returning normally wasted energy back to the source of the radiant energy. The housing 210 can be further rotated to a new surface such as another chamber that has a second particular radius, for example a larger radius, as in FIG. 19. A short-wave emission is then absorbed by this larger absorbing and emitting surface and is converted to a longer wavelength, such as a three-micron peak wavelength emission. The converted wavelength may then be emitted by the new high emissivity surface that resides on the inner and/or outer surface of the utilized chamber. FIGS. 17–19 succinctly depict the transducer housing 210 with the associate chambers of varying radii 240, in various modes of rotation around the infrared emitter 10.

The transducer housing 210 is constructed from a single high temperature material such as ceramic, quartz, metal, or cermet material. The housing 210 may also be constructed from a framework of ceramic, quartz, metal, cermet, or other high temperature material, where the conversion surfaces that absorb and radiate the modified wavelength or of wavelengths of electromagnetic energy are inserted into the holding frame. The inner and/or outer conversion surfaces are coated with a material or materials that will absorb the primary radiation with great efficiency. The exterior of the conversion surface will possess a high emissivity factor to enable the converted peak wavelength to be efficiently emitted into space. The materials on the inside may differ from the materials on the outside surface of any particular conversion/emitter surface. The materials may differ on the inside and/or outside of said surfaces from one lobe 240 to the next, depended on the absorption characteristics of the particular primary wavelength, the emissivity of the outside emitting surface for any particular conversion surface temperature, and resulting peak emission from said surfaces.

The absorber/emitter surface of any particular lobe 240 may also be a clear thermopane construction. A fluid that contains charged isotope particles may reside within the cavity of the thermopane construction, and be aligned with an electric current. This will permit either the passage of the primary wave of radiation with high levels of transmission or a varying percentage of absorption by the electronically rotated particles. The rotated particles, if positioned to absorb the primary energy, increase in temperature, thereby increasing the emitting surface temperature of the conversion device, providing a peak wavelength conversion, or multiple peak emissions.

The cooling fluid from the emitter 10 passes through the cooling parts 230 in the outer sheath 30 into the particular chamber 240 that has been selected for peak wavelength emission conversion to a longer wavelength. Strategically placed exhaust ports (not shown) in the housing 210 can permit the fluid flow out of the housing 210. These ports or holes may be placed along the perimeter of each of the conversion surfaces. This minimizes the conductive heat losses form the conversion emitter surface to the surrounding structural material, thereby increasing the radiant efficiency. In addition, the exhaust air will contain significant heat energy that will serve to increase the radiant efficiency of the secondary radiant conversion surface. The inner surface of the walls of the transducer housing 210 may also be plated, covered, or coated with a material that is highly reflective to the majority of the electromagnetic radiation emission.

The transducer housing 210 includes end fittings 310 that fit over each end of the transducer housing 210. The end fittings 310 accommodate the inner tube 40, and outer tube 30, and generally the infrared emitter 10. The fittings 310 act as an interface between the housing 210 and the outer tube 30, and permit an efficient seal to minimize and control cooling fluid losses. The fittings 310 also permit the rotation of the outer housing 210 around the outer tube 30 in order to select the proper position for the desired wavelength conversion. The fittings 310 may optionally include external clutches or gear teeth so that an external drive can automatically change the housing position relative to the stationary inner tube assembly. The inner surfaces of the fittings 310 may be plated, covered, or coated with a material that will efficiently reflect the primary and/or secondary radiant emissions. The fittings 310 and housing 210 may contain cooling ports 230, and may or may not be thermally insulated.

Figure 20:
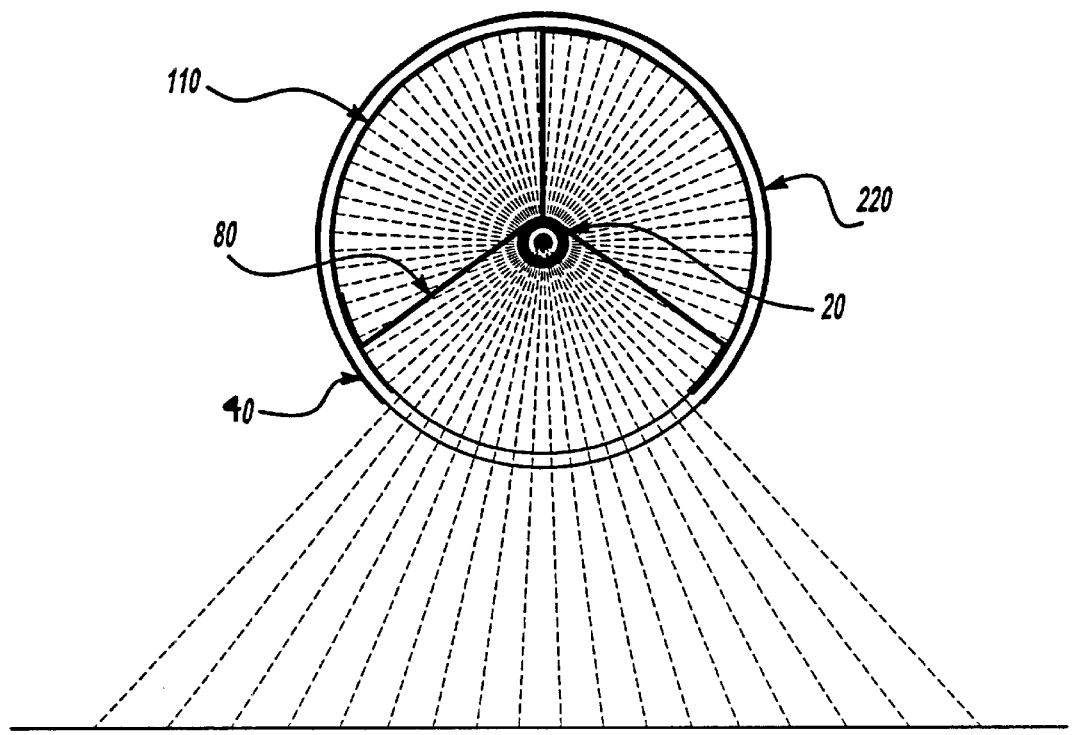
FIG. 20 depicts a single tube infrared emitter having an integral reflector.

It is possible to have a single tube integral reflector emitter. FIG. 20 depicts a single tube emitter which includes solely a tube 40 for the filament 20 of an infrared emitter 10. The single tube emitter is coated with a highly reflective material 110, such as gold, on the inside of the tube 40 and a high emissivity material optionally on the outside of the tube 220. The gold reflective film 110 and the high emissivity material 220 cover all but a predetermined portion of the infrared emitter 10. The radiant energy source 20 is held in position by the filament support 80.

Figure 21A:
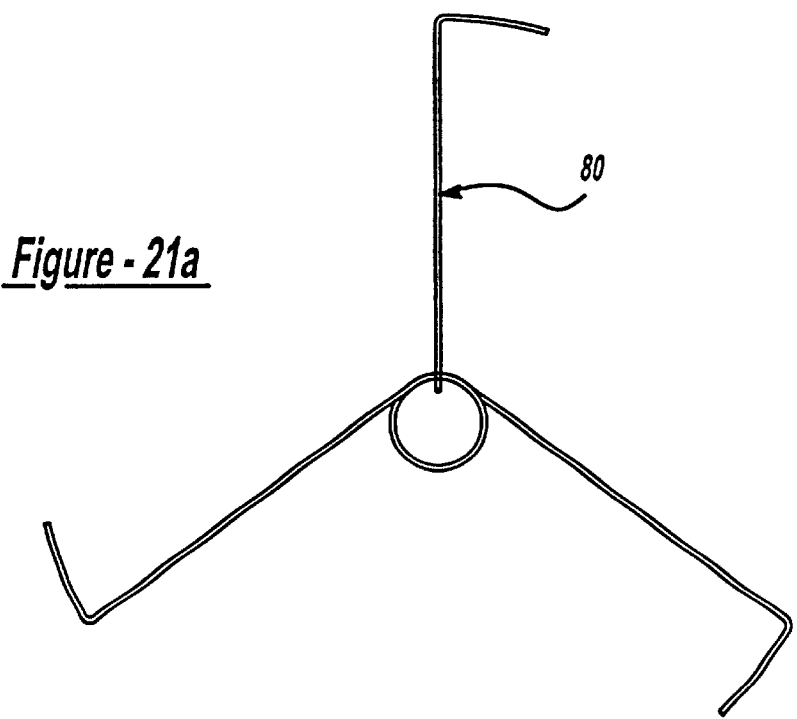
FIG. 21A depicts an end view of a filament support.
Figure 21B:
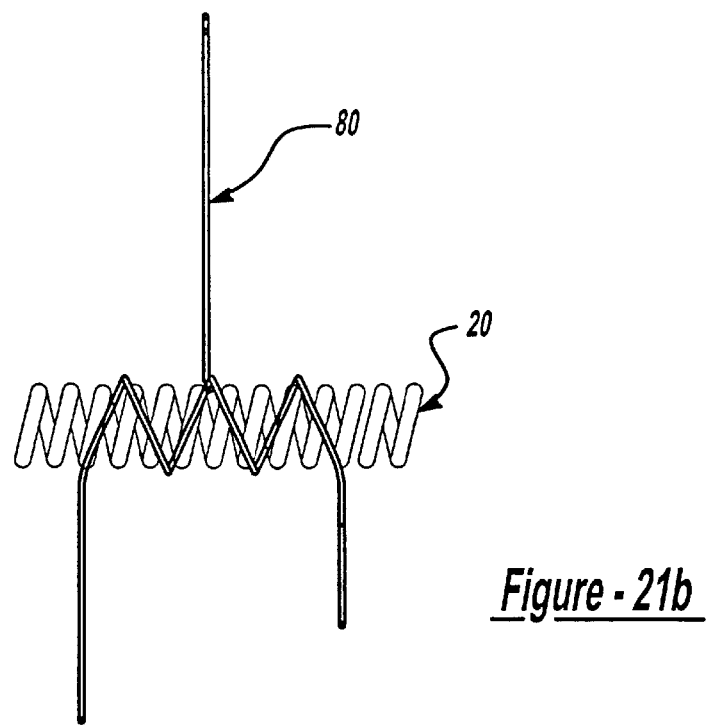
FIG. 21B depicts a side view of a filament and filament support device.
Figure 22:
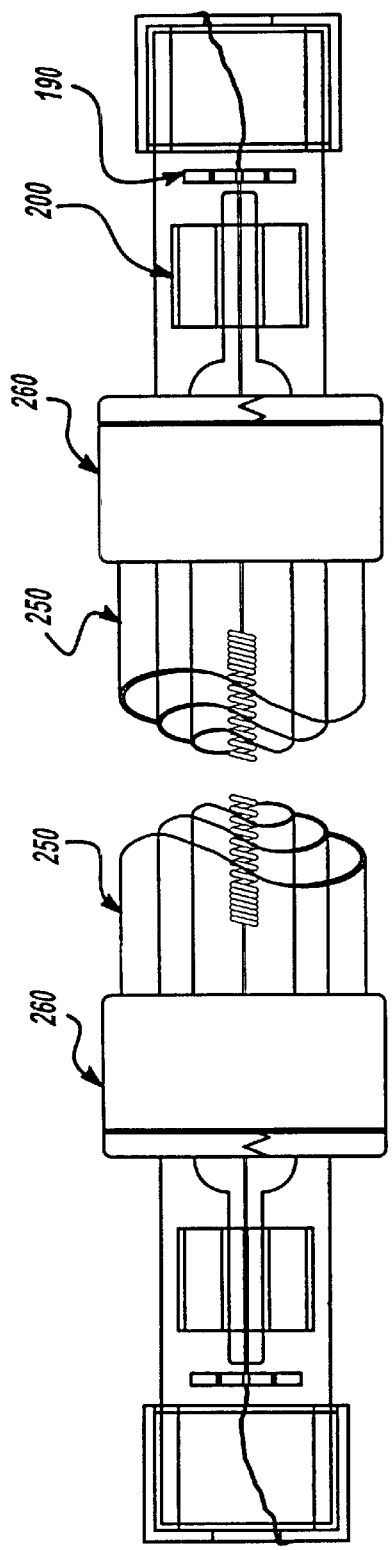
FIG. 22 is a three tube infrared emitter including an exhaust tube for controlled venting of purge fluid.
Figure 23:
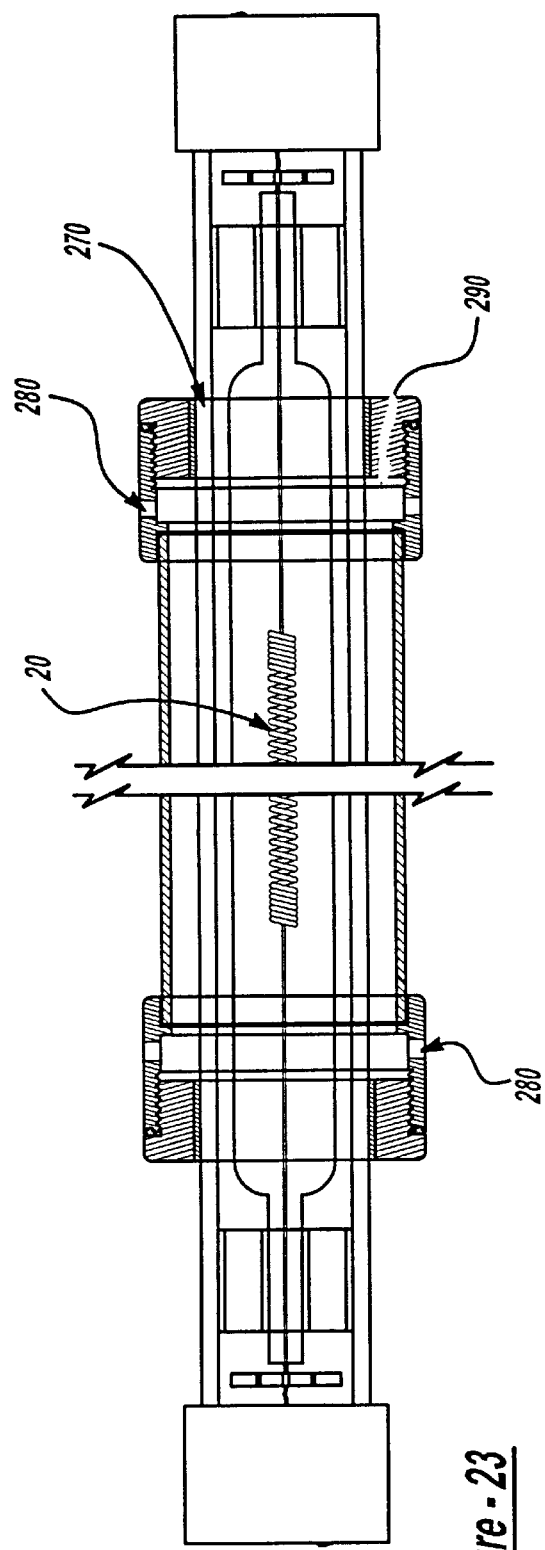
FIG. 23 is a cross-sectional view of the three tube infrared emitter of FIG. 22.
Figure 24:
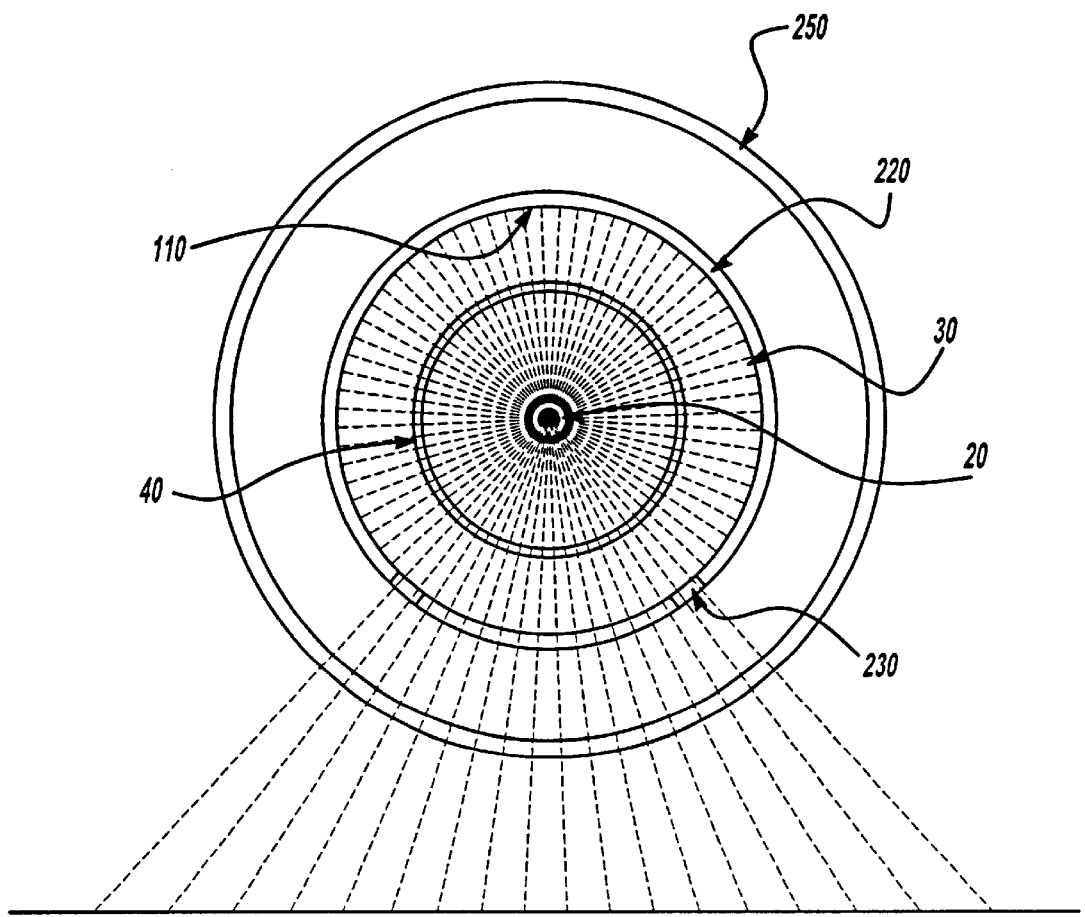
FIG. 24 is a cross-sectional end view of the three tube design showing the outer exhaust tube.

The filament support 80 includes a high temperature material, such as tungsten, tantalum, or other high temperature alloy, which forms a wire. In FIG. 21, the filament support 80 wraps in a direction opposite the direction in which the filament coil 20 wraps in order to prevent the filament coil 20 from slipping between the windings of the filament support 80. The filament support 80 includes a dielectric coating to electrically insulate the material from the filament 20 and the integral reflector material 110. The dielectric coating prevents current from flowing through the reflector material 110, resulting in an electrical short.

In FIGS. 22–28 an exhaust tube 250 encapsulates the inner 40 and outer 30 tube enclosures of the infrared emitter 10. The exhaust tube 250 directs cooling fluid flow between the inner 40 and the outer 30 tubes away from the work area. The exhaust tube 250 attaches to an exhaust fitting 260 which includes exhaust holes 280 for venting the cooling fluid escaping from the outer tube 30 completely away from the work area.

A split thread fastener 290 connects the exhaust tube 250 to the outer tube 30 of the infrared emitter 10. The split thread fastener 290 is split because the fastener cannot otherwise slide past the end caps 60 of the infrared emitter 10. The split thread fastener 290 includes at lest tow pieces each having teeth which mesh to form a unitary body when the split thread fastener 290 is installed. The split thread fastener 290 also includes a refractory material 270 which is placed between the outer tube 30 and the inner surface of the fastener 290. Then the respective halves of the split thread fastener 290 engage the outer tube 30 and the fastener 290 is threaded onto the end of the exhaust fitting 260. The exhaust tube 250 exhausts the cooling fluid away from the work area. As depicted in FIG. 28, an O-ring 300 is interposed between the split thread fastener 290 and the exhaust fitting 260 in order to provide a seal.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An infrared emitter comprising;
   a longitudinally extending energy emitting filament;
   a longitudinally extending, tubular enclosure formed of infrared energy transmitting material, the enclosure enclosing the filament, the enclosure having at least one inner tubular support device in a predetermined position, the inner tubular support device having a plurality of apertures operable to allow fluid flow through the inner tubular support device;

a longitudinally extending outer tubular sheath formed of infrared energy transmitting material, the outer tubular sheath having an inner and an outer surface and a plurality of ports at predetermined locations to allow fluid flow through the sheath;

a pair of end caps closing open ends of the outer sheath, each end cap having at least one passage operable to allow fluid flow therethrough;

a reflector formed on a surface of the sheath and extending partially circumferentially around the sheath to define a window through which Infrared energy may pass; and wherein the sheath is spaced apart from the enclosure to protect the reflector from the infrared energy being emitted by the filament.

2. An infrared emitter according to claim 1 wherein the emitter comprises a tungsten filament and a gas filling the enclosure comprised of halogen.

3. An infrared emitter according to claim 1 including a heat sink intimately associated with an electrical conductor extending from the filament out through the enclosure.

4. An infrared emitter according to claim 1 including a heat dissipater comprising a high emissivity coating disposed over the exterior reflector area forming an intimate contact with its substrate.

5. An infrared emitter according to claim 1 wherein the filament has two ends, each end with an associated electrical conductor and corresponding heat sink.

6. An infrared emitter according to claim 1 wherein the enclosure is a cylinder.

7. An infrared emitter according to claim 1 wherein the enclosure is parabolic.

8. An infrared emitter according to claim 1 wherein the enclosure is elliptical.

9. An infrared emitter according to claim 1 wherein the sheath is a cylinder.

10. An infrared emitter according to claim 1 wherein the sheath is parabolic.

11. An infrared emitter according to claim 1 wherein the sheath is elliptical.

12. An infrared emitter according to claim 1 wherein the inner tubular support is positioned concentric to the sheath.

13. An infrared emitter according to claim 1 wherein the inner tubular support material is high temperature such as ceramic, glass, and quartz, and reflective to electromagnetic waves.

14. An infrared emitter according to claim 1 wherein the inner tubular support is plated with an electromagnetic wave reflective material.

15. An infrared emitter according to claim 1 wherein the inner tubular support device aperture is constructed to permit minimum resistance to fluid flow.

16. An infrared emitter according to claim 1 wherein the inner tubular support device aperture is constructed to permit a resistance to fluid flow.

17. An infrared emitter according to claim 1 wherein the inner tubular support device aperture is constructed to create a back pressure of fluid flow.

18. An infrared emitter according to claim 1 wherein the inner tubular support device aperture is constructed to create a predetermined fluid flow pattern.

19. An infrared emitter according to claim 1 wherein the inner tubular support device aperture is constructed to create a uniform fluid flow pattern.

20. An infrared emitter according to claim 1 wherein the inner tubular support device aperture is constructed to create a loop-like fluid flow pattern.

21. An infrared emitter according to claim 1 wherein the inner tubular support device aperture is constructed to created rotational fluid flow pattern.

22. An infrared emitter according to claim 1 wherein the inner tubular support device is constructed to accommodate the sheath and the enclosure.

23. An infrared emitter according to claim 1 wherein the heat sink is constructed from a material with a rapid thermal conductivity, such as copper, aluminum, cermet, and metal alloy.

24. An infrared emitter according to claim 1 wherein the heat sink is designed to include a plurality of integral fins.

25. An infrared emitter according to claim 1 wherein the heat sink is plated with an electromagnetic wave reflective material.

26. An infrared emitter according to claim 1 wherein the outer surface of the sheath includes a disposed electromagnetic wave reflective film.

27. An infrared emitter according to claim 1 wherein ultra-violet emissions are simultaneously emitted with the infrared energy.

28. An infrared emitter according to claim 1 wherein the inner surface of the sheath includes a disposed integral electromagnetic wave reflective film.

29. An infrared emitter according to claim 1 wherein a high emissivity material is disposed on a surface of the window for electromagnetic wavelength emission conversion.

30. An electromagnetic emitter according to claim 1 wherein all emissions are comprised of greater than 50% within ultra-violet electromagnetic wavelength band.

31. An infrared emitter comprising:

a longitudinally extending energy emitting filament;

a longitudinally extending, tubular enclosure formed of infrared energy transmitting material, the enclosure enclosing the filament, the enclosure having at least one inner tubular support device in a predetermined position, the inner tubular support device having a plurality of apertures operable to allow fluid flow through the inner tubular support device;

a longitudinally extending outer tubular sheath formed of infrared energy transmitting material, the outer tubular sheath having an inner and an outer surface and a plurality of ports at predetermined locations to allow fluid flow through the sheath;

a pair of end caps closing open ends of the outer sheath, each end cap having at least one passage operable to allow fluid flow therethrough;

a reflector formed on a surface of the sheath and extending partially circumferentially around the sheath to define a window through which infrared energy may pass;

wherein the sheath is spaced apart from the enclosure to protect the reflector from the infrared energy being emitted by the filament; and a rotatable outer housing longitudinally extending along and partially circumferentially encapsulating the enclosure, the rotatable outer housing having a plurality of circumferential chambers wherein rotation of the housing positions a selected chamber to coincide with the window.

32. An infrared emitter comprising;

a longitudinally extending energy emitting filament;

a longitudinally extending, tubular enclosure formed of infrared energy transmitting material, the enclosure enclosing the filament;

a longitudinally extending outer tubular sheath formed of infrared energy transmitting material, the outer tubular sheath having an inner and an outer surface and a plurality of ports at predetermined locations to allow fluid flow through the sheath;

a reflector formed on a surface of the sheath and extending partially circumferentially around the sheath to define a window through which infrared energy may pass; and wherein the sheath is spaced apart from the enclosure to protect the reflector from the infrared energy being emitted by the filament.

33. The emitter of claim 32, wherein said enclosure has at least one inner tubular support device in a predetermined position.

34. The emitter of claim 33, wherein the inner tubular support device has a plurality of apertures operable to allow fluid flow through the inner tubular support device.

35. The emitter of claim 32, the emitter further comprising a pair of end caps closing open ends of the outer sheath.

36. The emitter of claim 35, wherein each end cap has at least one passage operable to allow fluid flow therethrough.

37. A method for heating an object with infrared energy comprising the steps of:

passing a current through an elongated filament to produce infrared energy, the filament being disposed within a hermetically sealed elongated tubular enclosure surrounding the enclosure with an outer elongated tubular sheath of infrared energy transmitting material having an inner and an outer surface with a plurality of ports strategically located at predetermined locations along the outer surface of the sheath, the sheath having two ends, each end having at least one passage for fluid flow therethrough, a reflective coating on an inner surface of the sheath extending partially circumferentially with the sheath and the central longitudinal section forming a window, a high emissivity coating disposed over the outer surface of the sheath and congruent to the reflective coating, and in intimate contact with its substrate, the central longitudinal section of the sheath being spaced apart from the enclosure about the entire circumference of the enclosure sufficiently to protect the reflective coating from the infrared energy being emitted by the filament, reflecting infrared radiation from the filament off of the reflective coating on the sheath, back toward the filament, passing infrared radiation towards an object from the filament through the window, and passing a cooling fluid through the space between the sheath and the enclosure to cool the end seals, the sheath, the reflective coating, and the high emissivity coating.

\* \* \* \* \*

UNITED STATES PATENT AND TRADEMARK OFFICE
CERTIFICATE OF CORRECTION

PATENT NO. : 6,399,955 B1
DATED : June 4, 2002
INVENTOR(S) : Fannon

It is certified that error appears in the above-identified patent and that said Letters Patent is hereby corrected as shown below:

Column 1,
Line 49, delete "articulate" and insert -- particulate --.

Column 2,
Line 25, delete "." after "hermetically".

Column 7,
Line 45, delete "1 10" and insert -- 110 --.

Column 8,
Line 48, after "can" delete "15".

Column 11,
Line 13, delete "Infrared" and insert -- infrared --.

Column 12,
Line 61, delete "," and insert -- : --.

Signed and Sealed this

Fourteenth Day of January, 2003

JAMES E. ROGAN
*Director of the United States Patent and Trademark Office*